United States Patent [19]

Stamm

[11] Patent Number: 4,758,715
[45] Date of Patent: Jul. 19, 1988

[54] ILLUMINATION DEVICE FOR OPTICAL RECOGNITION AND READING HAVING CURVED MIRRORS

[75] Inventor: Peter Stamm, Radolfzell, Fed. Rep. of Germany

[73] Assignee: Licentia Patent-Verwaltungs-GmbH, Fed. Rep. of Germany

[21] Appl. No.: 850,767

[22] Filed: Apr. 11, 1986

[30] Foreign Application Priority Data

Apr. 18, 1985 [DE] Fed. Rep. of Germany ....... 3514014

[51] Int. Cl.$^4$ ............................ G06K 7/10; G06K 7/14
[52] U.S. Cl. ...................................... 235/454; 235/462; 235/470; 250/566; 350/174
[58] Field of Search ............... 235/454, 462, 439, 456, 235/461, 467, 470, 494; 382/65, 67; 250/555, 556, 566–569, 578; 209/900; 362/296, 297, 298, 301, 302; 350/171, 172, 174

[56] References Cited

U.S. PATENT DOCUMENTS

| | | | |
|---|---|---|---|
| 2,922,893 | 1/1960 | Ett | 235/454 |
| 3,043,190 | 7/1962 | Mandler | 362/298 |
| 3,163,746 | 12/1964 | Hoeser | 235/454 |
| 3,457,401 | 7/1969 | Hoekstra | 362/298 |
| 3,781,800 | 12/1973 | Cramer et al. | 235/470 |
| 3,928,759 | 12/1975 | Sansone | 235/467 |
| 4,057,784 | 11/1977 | Tafoya | 250/568 |
| 4,160,902 | 7/1979 | van Wijngaarden | 235/462 |
| 4,408,120 | 10/1983 | Hara et al. | 235/454 |

FOREIGN PATENT DOCUMENTS

| | | |
|---|---|---|
| 36149 | 9/1981 | European Pat. Off. . |
| 1117319 | 11/1961 | Fed. Rep. of Germany . |
| 1247052 | 8/1967 | Fed. Rep. of Germany . |
| 1296899 | 5/1962 | France . |
| 1405314 | 5/1965 | France . |
| 56-116176 | 9/1981 | Japan ................................. 235/454 |
| 1181006 | 2/1970 | United Kingdom . |

*Primary Examiner*—Raymond F. Cardillo
*Assistant Examiner*—Robert A. Weinhardt
*Attorney, Agent, or Firm*—McGlew and Tuttle

[57] ABSTRACT

To reduce the engineering and operating costs, particularly to save a radiation source and minimize the space requirement of the illuminating device for the automatic reading of markings that are optically recognizable on a carrier, e.g. alphanumeric symbols on shipments such as letters, postcards, check cards, vouchers and the like, the light flux of a radiation source is utilized better by an additional, simple and inexpensive arrangement consisting of two mirrors. These mirrors are disposed around the radiation source and the radiation source generates two radiation beams which are sent on their way to the carrier to be illuminized first through a condenser system and are then redirected by reflectors in such a manner that the angle of incidence alpha of their beam axes to the carrier surface is essentially the same and that, after focusing the radiation beams, both illuminate the same partial area of the carrier.

7 Claims, 1 Drawing Sheet

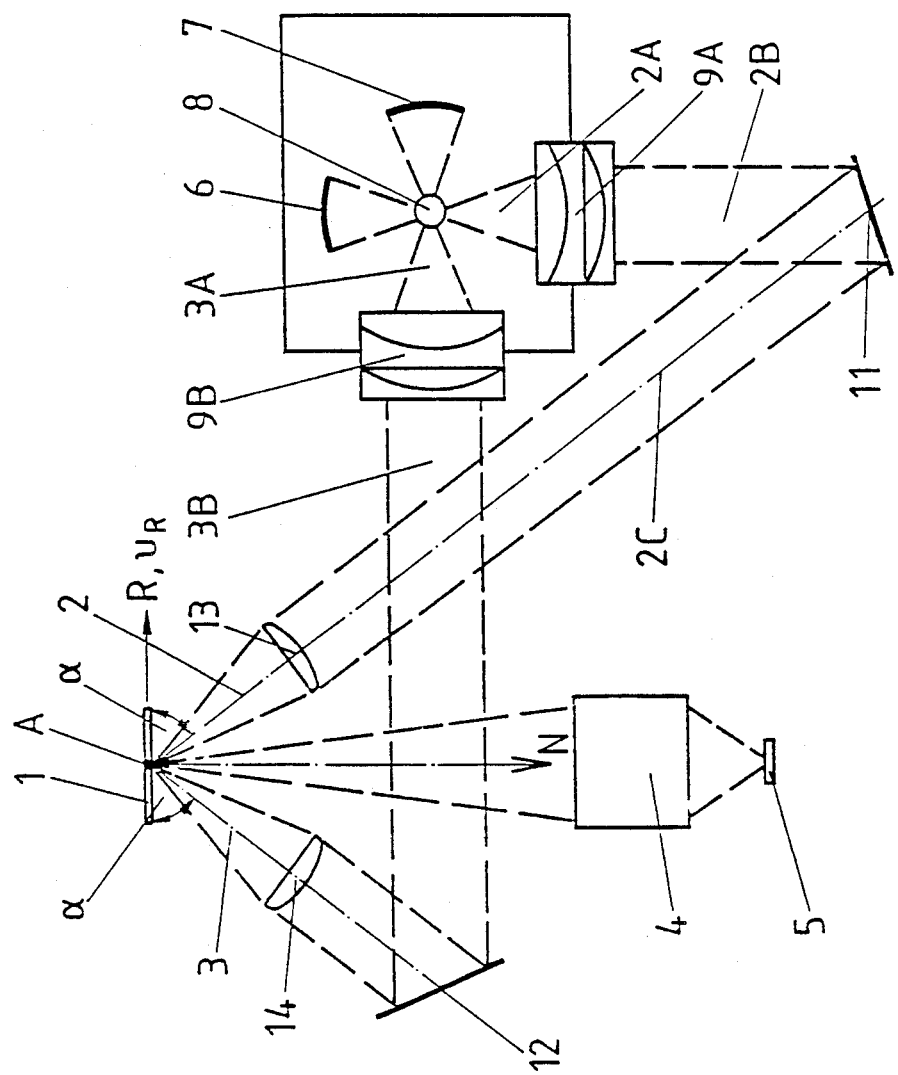

ILLUMINATION DEVICE FOR OPTICAL RECOGNITION AND READING HAVING CURVED MIRRORS

FIELD AND BACKGROUND OF THE INVENTION

The present invention relates in general to optical readers and in particular to a new and useful illuminating device for illuminating optically recognizable marks on a carrier or the like, in particular alpha numeric symbols.

In one known device of this kind the carriers, such as letters, cards, vouchers or other shipments are illuminated linearly during their transport through a reading zone and at approximately 45° to the normal by means of separate lights and associated optic lenses. The beam received by the reading device, which has on the input side a photo receiver in the form of a photodiode line, travels at 0°, i.e. in the direction of the normal.

SUMMARY OF THE INVENTION

It is an object of the invention to reduce the engineering and operating costs of this known device on the one hand, and its space requirements on the other, without significantly lowering the illumination intensity in the reading zone or illumination area.

Accordingly another object of the invention is to provide an illuminating device for illuminating optically recognizable markings, in particular alpha numeric symbols, on a carrier at an illumination area for reading the marksings, comprising a single source of electromagnetic radiation, and optical means for receiving the electromagnetic radiation from the source and for producing at least two separate electromagnetic radiation beams therefrom, the optical means directing the beams toward the illumination area.

A further object of the invention is to provide an illuminating device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWINGS

Particularly useful embodiments of the invention and their further developments are described below in greater detail with reference to the single FIGURE which is a schematic top plan view of the invention.

For the sake of better clarity this top view is not to scale.

DESCRIPTION OF THE PREFERRED EMBODIMENTS

Referring now to the FIGURE, the present invention comprises an illuminating device for an automatic optical reader.

For automatically reading, e.g. the writing on the envelope of a letter, designated in the FIGURE as carrier 1, the illuminating device preferably has two separate electromagnetic radiation beams 2,3 of high radiation intensity which illuminate the zip code, place of destination and address, in the address field of the envelope. By means of an optical detector 5, equipped with an objective 4 and preferably disposed in the direction of the normal N of the carrier 1, the writing on the letter envelope is read.

In order to get an illumination intensity sufficient for the detector 5, a number of radiation sources appropriate for the generation of two radiation beams has been used to date.

In order to be able to save one radiation source (i.e. lamp housing, ballast and bulb, for example), thus also reducing the space requirement, two mirrors 6,7 disposed around a radiation source 8 are used in advantageous manner. The radiation radiated by the radiation source 8 is preferably reflected by the mirrors 6,7 so that two radiation beams 2A, 3A, composed of the reflected component and the component furnished directly by the radiation source 8, originate.

In order to achieve adequate separation of the radiation beams 2A, 3A as well as easy adjustability of the succeeding optics, a 90° configuration of the mirrors 6,7 is to be preferred (see the FIGURE). The mirrors are advantageously disposed on a circle around source 8, particularly when the radiation characteristic of the radiation source 8 is rotationally symmetrical. The radiation source 8 should, if at all possible, be disposed in the associated center of the circle. So that the radiation beams will permit a uniform and easy to obtain illumination of the illumination area of the carrier 1, a configuration is to be selected in which at least the radiation source is rotationally symmetrical about the vertical axis of the radiation source 8, the mirrors 6,7 are disposed on a circle around this vertical axis and the radiation source 8 lies in one common plane with the centers of the mirrors.

Furthermore, the radiation source 8 should lie, if at all possible, on the connecting line mirror focal point - vertex. The mirrors 6,7 may be spherical, parabolic or cylindrical.

Generally, it is possible, of course, to generate more radiation beams by means of more mirrors, in order to be able to utilize even better the light flux from the radiation source 8.

As shown in the FIGURE, the two generated radiation beams 2A, 3A are sent on their way to the carrier 1 to be illuminated first through a lens system 9A, 9B which works as condenser and preferably generates a quasi-parallel beam path for the respective radiation beam. The radiation propagation directions of both radiation beams are made to be in a plane (beam axes of the beams lie in a plane), by the placement of lens systems 9A and 9B. This generates uniform reflection conditions for the optic receiver. Both radiation beams 2A, 3A will illuminate the carrier 1, i.e. the letters to be read, under an equal, specified angle of incidence α (alpha), e.g. by means of an optic system composed of reflecting and focusing means 11 to 14.

In the simplest case, the reflecting means may be planar mirrors 11, 12 which reflect the incident, quasi-parallel radiations 2B, 3B so that the desired direction of incidence of the radiations on the carrier 1 is obtained at the 45°, angle α due to the redirection they cause.

This means that the redirected radiation beam 2C penetrates the not redirected part of the radiation beam 3B, i.e. before its redirection, unhindered, spreading directly in the direction of the letter to be illuminated.

When selecting equal angles of incidence, the contribution of both radiation beams 2,3 to the total intensity at the photoreceiver 5 can be divided in half.

During the reading operation the letter 1 is preferably transported continuously in a direction R, in which the horizontal beam axes of the incident radiation beams 2,3 always form the same angle with the surface normal N of the letter, preferably 45°. To obtain the highest possible illumination intensity, the points of impact A of the two beam axes should coincide so that both radiation beams illuminate the same area of the letter.

A simple, linear photodiode arrangement suffices as optic receiver 5 for the reading operation, if the area to be illuminated is preferably chosen in line form preferably arranged so that the longitudinal direction of the illuminated area runs parallel to the photodiode line and perpendicular to the transport direction R of the letters lying on their longitudinal edge, and perpendicular to the beam axes of the radiation beams 2,3.

Focusing the radiation beams 2,3 linearly on the carrier is achieved through a cylindrical lens system, 13,14 directly in front of the carrier, spaced from it by the focal length of the lens system. Lens systems 13, 14 are near the output of the illumination device as opposed to lens systems 9A,9B that are near the input.

For the recognition of characters by means of a photodiene (detector 5) the width of the linear illumination is to be chosen considerably smaller than the narrowest character appearing. The height to be selected for the photodiode line depends on the height of the address field to be read. Thus, by means of a fast scanning method in which only the areas (letter) to be scanned is moving, the recognizable characters (markings) can be read. The scanning frequency must be selected so high that a character to be recognized is scanned often enough horizontally (columnwise) in several places during its transport. By splitting the image up into narrow, columnwise image sections the two-dimensioned address field can be read by means of a one-dimensionally operating electro-optic receiver.

The greater speed $v_R$ of the letter 1, the higher the scanning rrequency to be chosen. A character should be scanned 5 to 10 times across its width, for example.

If punctiform focusing is desired because e.g. a bar code is to be read, the lens systems 13, 14 are to be designed accordingly, either parabolically or else spherically, if sufficient.

In the selection of the radiation source 8 conventional lamps such as maximum pressure discharge lamps may be resorted to. Generally, however, a monochromatic source operative in the visible range, in the infrared, UV or also mm range is also suited for this purpose, especially when disturbing background light is present. The receiver 5 is to be selected accordingly.

While specific embodiments of the invention have been shown and described in detail to illustrate the application of the principles of the invention, it will be understood that the invention may be embodied otherwise without departing from such principles.

What is claimed is:

1. An illuminating device for illuminating optically recognizable markings on a carrier at an illumination area and for reading the markings, comprising:

a single source of electromagnetic radiation;

a first curved mirror having a focal length and disposed on one side of said source for reflecting radiation from said source back through said source to form a first beam which includes at least some radiation emanating directly from said source;

a second curved mirror having a focal length positioned on a side of said source at a location spaced away from said first curved mirror for reflecting radiation from said source and directing it through said source to form a second beam, said second beam including at least some radiation emanating directly from said source;

a first condenser lens system on a side of said source opposite from said first curved mirror for receiving said first beam and forming it into a first substantially parallel beam;

a second condenser lens system on a side of said source opposite from said second curved lens for receiving said second beam and forming it into a second parallel beam;

a first planar mirror spaced from said first condenser lens system for redirecting said first parallel beam into a re-directed beam having an axis extending to the illumination area;

a second planar mirror spaced from said second condenser lens system for receiving said second parallel beam and re-directing said second parallel beam into a second re-directed beam having an axis extending to the illumination area;

a first output lens system on said first re-directed beam for focusing said first re-directed beam onto the illumination area;

a second output lens system on said second re-directed beam for focusing said second re-directed beam onto the illumination area, said axes of said first and said second re-directed beams lying at equal selected angles to a plane containing the illumination area and on opposite sides of a normal line from the illumination area; and detector means lying on said normal line for detecting radiation reflected from the illumination area.

2. A device according to claim 1, wherein said first re-directed beam intersects said second parallel beam, said redirected beams, said parallel beams, and said electromagnetic radiation beams all lying on a common plane which also contains said normal line.

3. A device according to claim 2, wherein said first and second curved mirrors are spaced from said source by an amount at least greater than their focal length.

4. A device according to claim 3, wherein said first and second curved mirrors lie on a common circle centered around said source, said first and second curved mirrors being spaced from each other by 90° on said circle.

5. A device according to claim 1, wherein said source of electromagnetic radiation comprises an electric lamp.

6. A device according to claim 5, wherein said electric lamp comprises a maximum pressure discharge lamp.

7. A device according to claim 1, wherein said source of electromagnetic radiation is monochromatic.

* * * * *